METHOD OF AND APPARATUS FOR CUTTING TO LENGTH AND FOLDING WEBS, ESPECIALLY RUBBERIZED CORD FABRIC WEBS FOR THE MANUFACTURE OF TIRES

Filed Oct. 7, 1965 3 Sheets-Sheet 1

June 11, 1968 H. MENELL ET AL 3,387,841

METHOD OF AND APPARATUS FOR CUTTING TO LENGTH AND FOLDING WEBS, ESPECIALLY RUBBERIZED CORD FABRIC WEBS FOR THE MANUFACTURE OF TIRES

Filed Oct. 7, 1965 3 Sheets-Sheet 2

METHOD OF AND APPARATUS FOR CUTTING TO LENGTH AND FOLDING WEBS, ESPECIALLY RUBBERIZED CORD FABRIC WEBS FOR THE MANUFACTURE OF TIRES

Filed Oct. 7, 1965 3 Sheets-Sheet 3

INVENTORS:
Hans Menell
Heinrich Nädler
BY
[signature]

United States Patent Office 3,387,841
Patented June 11, 1968

3,387,841

METHOD OF AND APPARATUS FOR CUTTING TO LENGTH AND FOLDING WEBS, ESPECIALLY RUBBERIZED CORD FABRIC WEBS FOR THE MANUFACTURE OF TIRES

Hans Menell, Ahlem, Hannover, and Heinrich Nädler, Hagen, near Nienburg, Germany, assignors to Continental Gummi-Werke Aktiengesellschaft, Hannover, Germany Filed Oct. 7, 1965, Ser. No. 493,701
Claims priority, application Germany, Oct. 8, 1964, C 34,051
5 Claims. (Cl. 270—61)

ABSTRACT OF THE DISCLOSURE

The present invention relates to an apparatus for cutting to length and folding webs, especially rubberized cord fabric webs for the manufacture of tires.

The apparatus according to the invention is characterized primarily in that it comprises clamping means movable over a first portion of a web section received and supported by table means and clamped thereagainst, while a second portion of said web portion protrudes beyond said clamped-in first portion, a folding line defining member being movable over said clamping means and having an edge movable beyond said clamping means and thereby beyond said clamped-in web portion. The apparatus according to the invention is furthermore characterized by folding means adjacent said table means and operable to engage from below said second web portion and to fold the same over the edge of said folding line defining member in the direction toward said first web portion.

The present invention relates to a device for cutting to length and folding webs, especially rubberized cord fabric webs for the manufacture of tires.

In connection with the manufacture of pneumatic tires, especially belted tires, it is necessary from rubberized cord fabrics to cut off strip sections on a bias and to fold said sections so as to double the same whereby strips with inclined cord threads as required in connection with the building up of tire belts are obtained, said strips having for instance a U-shaped cross section.

It is known to process the said webs on transverse or at an angle cutting devices. The sections obtained on such devices are then folded in a separate working operation.

It is an object of the present invention to provide a device for improving the cutting to length and folding of webs for the tire manufacture, especially the manufacture of belted tires..

It is another object of this invention to provide a device as set forth in the preceding paragraph which will greatly increase the precision of the folding operation, the precision of the course of the threads and the precision of the dimensions.

These and other objects and advantages of the invention will appear more clearly from the following specification in connection with the accompanying drawings, in which:

FIG. 1 diagrammatically illustrates a side view of a cutting and folding device for rubberized cord fabric.

Figure 1:
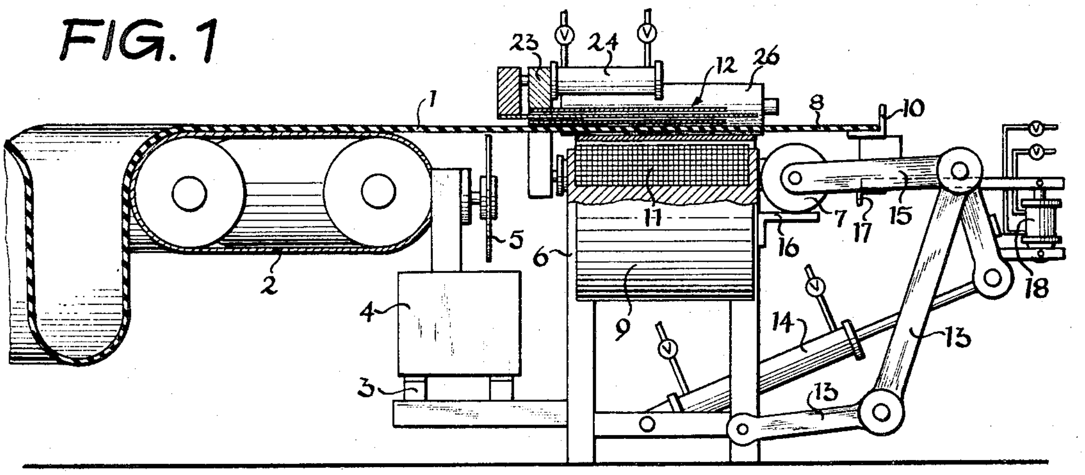
Figure 5:
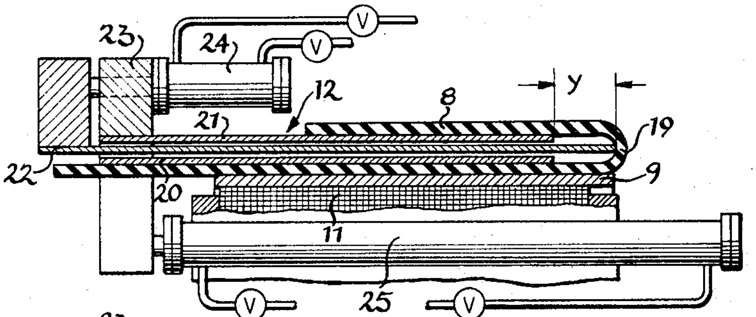
Figure 6:
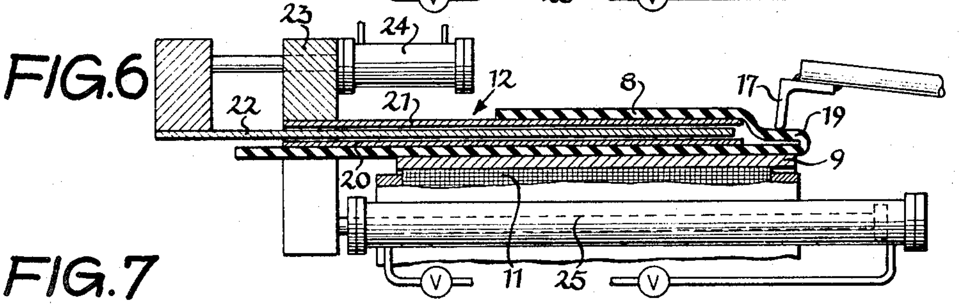
Figure 7:
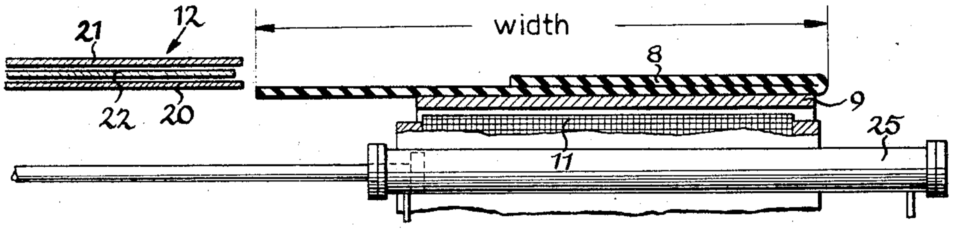
Figure 2:
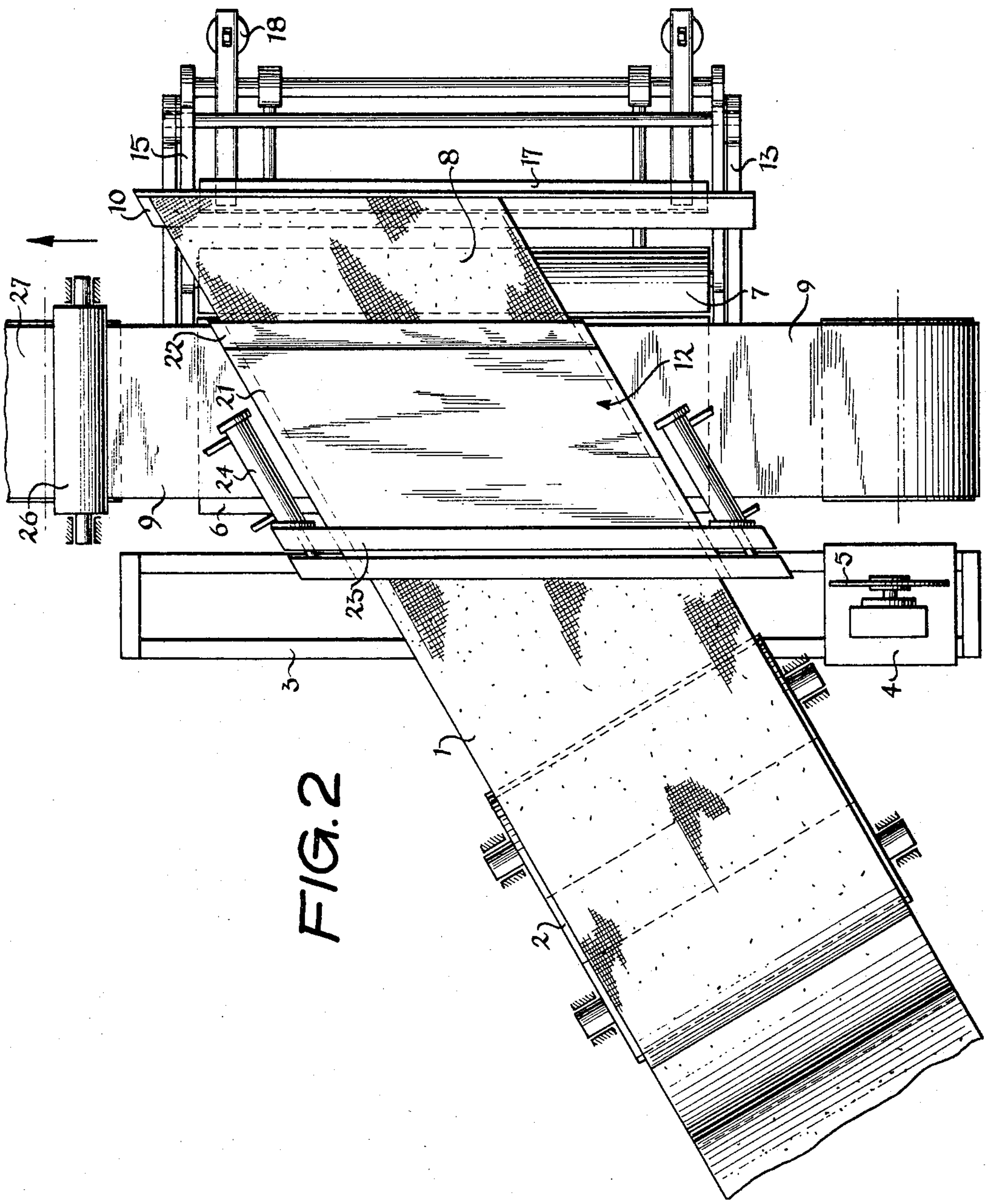
FIG. 2 is a top view of the device of FIG. 1.

FIGS. 5 to 7 respectively illustrate various phases of operation of the device for folding the web.

The device for cutting to length webs, especially rubberized cord fabric webs, for the manufacture of pneumatic tires according to the present invention is characterized primarily by an arrangement for holding and folding the web section to be cut off. In this connection it is of importance that the web section which is to be cut to length and to be folded is during the cutting operation non-displaceably held on a support and that the holding means will release the web only after the folding operation has been completed.

The holding of the web section to be cut to length brings about that the web which is easily deformable under mechanical influences will not be subjected by the cutting knife to any undesirable deformation. If furthermore, the cut-off section is released only after the folding step has been completed, it will also be assured that during the folding operation any harmful effect upon the cord fabric will be prevented. It is to be understood that these operations can, due to the holding step, be carried out at a high speed because the cutting device and the device for folding form a structural unit.

The invention also concerns a particularly advantageous device for folding the said webs. In conformity with the present invention, this last-mentioned device comprises a flat sliding member which is arranged parallel to the web section while the free edge of the respective section is adapted, preferably by means of a roller, to be passed around the free edge of said sliding member. In this connection it is also important that the web section within the range of the folding area is adapted, after a retracting movement of the sliding member, to be engaged by a pressing body. This pressing body is intended to non-displaceably hold the fold portion which is determined by the free edge of the sliding member. This holding of the fold portion is necessary when the folding operation is being carried out or is being finished or when the sliding member carries out a retracting movement.

In order to prevent any damage to the sticky rubberized fabric when the said sliding member carries out a retracting movement, the said sliding member is displaceably mounted preferably in a sheath composed of thin-walled parts. Thus, the rubberized cord fabric contacts only portions of said sliding member and thus will, over the major portion of its length, not to be in contact with said sliding member but will engage the sheath which is stationary during the movement of the sliding member.

Referring now to the drawings in detail, the arrangement shown therein comprises primarily a conveyor belt 2 for feeding the web 1 into a cutting device 4 which is mounted on guiding means 3 and is equipped with a cutting knife 5 and a table 6 with a folding roller 7, said table being behind the cutting knife 5 when looking in the direction of movement of the fabric web 1.

Guiding means 3 as well as table 6 will in conformity with the desired bias cut extend at an angle with regard to the longitudinal direction of the cord fabric web 1 to be cut to length.

For removing the cut to length fabric section 8, there is provided a conveyor belt 9, preferably a steel band, by means of which the fabric section 8 can be withdrawn from table 6 toward the side.

Fabric web 1 is advanced first to such an extent that the free end engages an abutment 10. Thereupon a magnet 11 arranged in the upper portion of table 6 is made effective so that the latter will attract not only conveyor belt 9 but also sheet metal members 12 arranged above fabric web 1, the meaning of said sheet metal members 12 will be explained further below. Magnet 11 attracts sheet metal members 12 in such a way that fabric web 1 will be firmly clamped-in over its width.

Thereupon the cutting operation is initiated and effected. To this end, the cutting device 4 is moved in a direction transverse to fabric web 1 and in this way the fabric section 8 which when spread out in flat condition will have a parallelogram-shaped top view.

Figure 3:
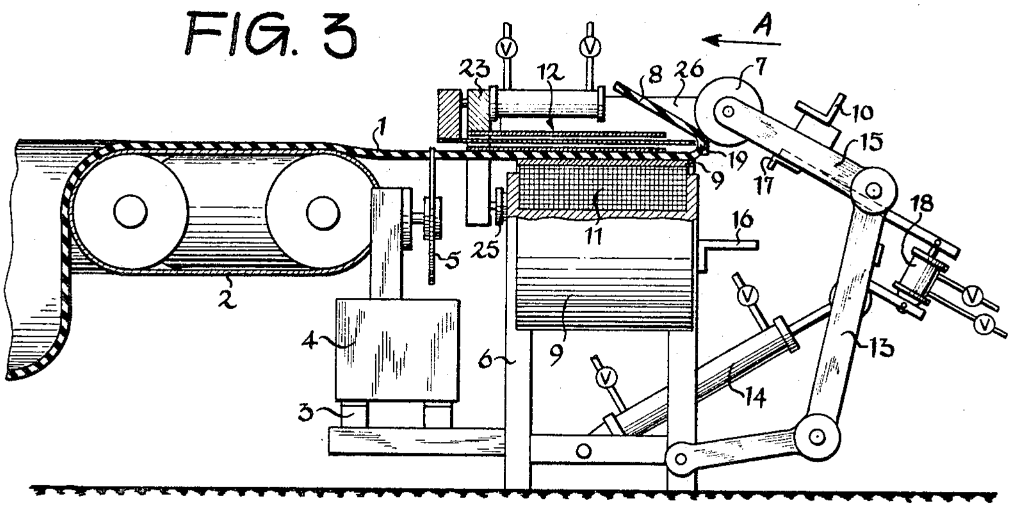
FIGS. 3 and 4 illustrate a side view of the arrangement of FIG. 1, but illustrating different working phases.
Figure 4:
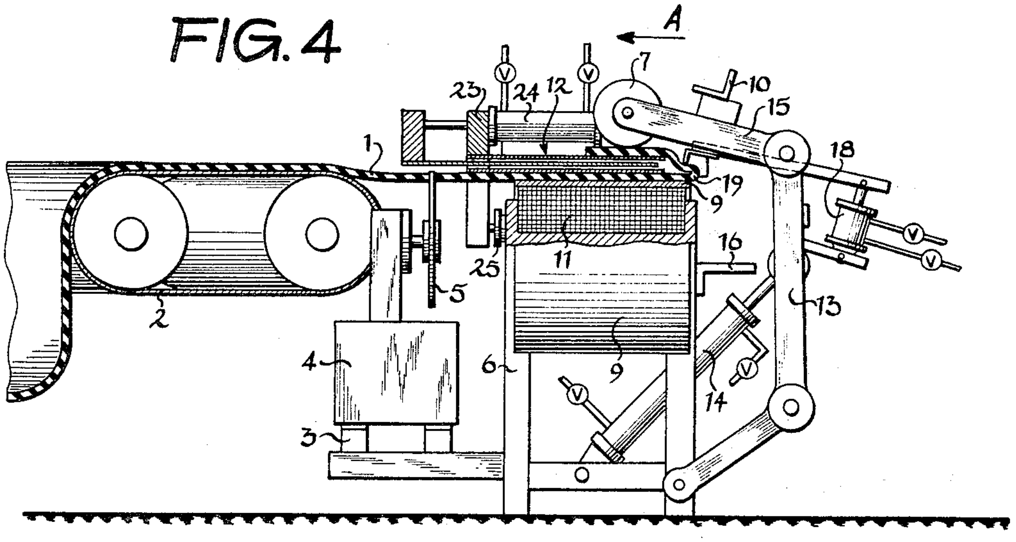

By means of a lever 13 and an operating cylinder 14 there is journalled the folding roller 7 the supporting arms 15 of which are provided with an abutment 10. When roller 7 occupies its rest position, it rests on a protrusion 16 of table 6. Folding roller 7 is adapted by means of the working cylinder 14 to be lifted in such a way that it will be able from below to engage that marginal portion of fabric section 8 which protrudes beyond table 6. During a further movement of folding roller 7, the latter carries out a movement in the direction indicated by the arrows A in FIGS. 3 and 4. Thus, folding roller 7 passes the free marginal portion of fabric section 8 over the sheet metal members 12. When folding roller 7 is in the position shown in FIG. 4, a pressing body 17 which is linked to levers 13 is by means of a working cylinder 18 lowered upon the fabric section 8 and, more specifically, into the vicinity of fold edge 19 as is clearly indicated in FIGS. 4 and 6.

The said sheet metal members 12 perform an important function not only with regard to holding the fabric section 8 during this cutting operation but also during the folding operation of the fabric section. According to the specific embodiment shown in the drawings, three superimposed sheet metal plates 12 are provided of which the lowermost plate 20 and the uppermost plate 21 serve as sheath for a sheet metal plate 22 placed therebetween. Sheet metal plate 22 extends in length to a greater extent than the sheet metal plates 20 and 21. Plates 20 and 21 are connected to a support 23 which extends over the width of web 1. A working cylinder 24 is provided on support 23 for displacing and guiding the sheet metal plate 22. In addition thereto, support 23 has associated therewith a further working cylinder 25 which is adapted to displace all of sheet metal members 12 in order to remove members 12 from table 6 and to be able to move the fabric webs 1 better over table 6 onto abutment 10.

When lifting folding roller 7, in other words during the folding operation, during which magnet 11 is made effective, the free end of sheet metal plate 22 extends beyond the ends of sheet metal plates 20 and 21 in conformity with FIG. 5. The folding line 19 is thus precisely determined and extends generally precisely parallel to the cutting line of the cutting device 4. In order to be able to fix the folding line 19 when folding roller 7 occupies the position shown in FIG. 4, plate 22 is caused to carry out a retracting movement so that also the free end of sheet metal plate 22 will be in the sheath formed by sheet metal plates 20 and 21. It is then possible for the pressing body 7 to act upon the fabric section 8 in the vicinity of the folding line 19. Working cylinder 25 now becomes effective and all members 12 are pulled out from the U-shaped folded fabric section 8 so that only the fabric section 8 folded in conformity with FIG. 7 will remain on table 6 or conveyor belt 9 or will freely rest on conveyor belt 9. Conveyor belt 9 may now be actuated while the folded fabric section 8 is pulled off toward the side. If desired, also above conveyor belt 9 there may be provided a pressing roller 26 in order closely and fold-free to compress the two parts of the folded section 8. The folded fabric section 8 may be withdrawn from the device at 27.

In order to assure a distortion-free precise processing of fabric web 1 and of the fabric section 8 cut off therefrom, it is of great importance that the clamping of fabric section 8 brought about by magnet 11 and members 12 attracted thereby will be maintained not only during the cutting operation by the cutting device 4 but also during the folding operation according to FIGS. 3, 4, 5 and 6. Therefore, distortion of the fabric section 8 cannot occur. Furthermore, it is possible to provide the folding line 19 at the precisely intended area. In this connection, the sliding member formed by sheet metal plate 22 is of importance inasmuch as its free edge determines the folding line 19, and will assure a straight folding edge.

It may be mentioned that the sheet metal plates 20, 21 which form the sheath are not necessary under all circumstances but are advantageous with the sticky rubberized cord fabric because they prevent a disadvantageous effect exerted upon the fabric course when sliding member 22 carries out a retracting movement. The pressing body 17 prevents distortions and deformations of fabric section 8 when plates 12 are moved from the position shown in FIG. 6 to the position shown in FIG. 7. It may also be mentioned that the folding device together with the sheet metal plates 12 can advantageously be employed independently of a cutting device.

It is, of course, to be understood that the present invention is, by no means, limited to the particular arrangements shown in the drawings but also comprises any modifications within the scope of the appended claims.

What we claim is:

1. A web folding device for use in connection with a cutting device for webs, especially rubberized cord fabric webs for pneumatic tires, which includes: table means adapted to receive and support a web section to be folded and cut off from a web, clamping means movable over a first portion of a web section received and supported by said table means, said clamping means being operable to clamp said first web portion against said table means while a second portion of said web section protrudes beyond said clamped-in first portion, a folding line defining member movable over said clamping means and having an edge movable beyond said clamping means and thereby beyond said clamped-in web portion, and folding means arranged adjacent said table means and operable to engage from below said second web portion and to fold the same over said edge of said folding line defining member in the direction toward said first web portion.

2. An arrangement according to claim 1, which includes means arranged adjacent said table means and operable to engage and press against said second web portion near the folding line of said folded web section after a slight withdrawal therefrom of said folding line defining member.

3. An arrangement according to claim 1, which includes guiding means for guiding said folding line defining member in its movement above said clamping means.

4. An arrangement according to claim 1, in which said clamping means includes an energizable magnet.

5. An arrangement according to claim 1, in which said folding means includes a folding roller movable from below a web section on said table means to a level above said folding line defining member, and fluid operable means operatively connected to said folding roller for actuating the same.

References Cited

UNITED STATES PATENTS

| | | | |
|---|---|---|---|
| 1,260,031 | 3/1918 | Perkins | 270—61 |
| 1,746,119 | 2/1930 | Koleta | 270—61 |
| 2,709,080 | 5/1955 | Gilchrist | 270—84 |
| 2,742,282 | 4/1956 | Ervin | 270—61 |
| 3,089,694 | 5/1963 | Smith | 270—61 |
| 3,124,348 | 3/1964 | Arbter | 270—61 |

EUGENE R. CAPOZIO, *Primary Examiner.*

P. WILLIAMS, *Assistant Examiner.*